(12) United States Patent
Loup et al.

(10) Patent No.: US 6,419,006 B1
(45) Date of Patent: Jul. 16, 2002

(54) MOTOR VEHICLE HEATING AND/OR AIR CONDITIONING DEVICE WITH IMPROVED AIR MIXING

(75) Inventors: Didier Loup, Maurepas; Michel Auvity, Velizy; Jean-Yves Queinnec, Elancourt; Philippe Vincent, Epernon, all of (FR)

(73) Assignee: Valeo Climatisation, S.A., La Verriere (FR)

( * ) Notice: Subject to any disclaimer, the term of this patent is extended or adjusted under 35 U.S.C. 154(b) by 0 days.

(21) Appl. No.: 09/469,439

(22) Filed: Dec. 21, 1999

(30) Foreign Application Priority Data

Dec. 22, 1998 (FR) .............................................. 98 16249

(51) Int. Cl.⁷ .......................... F25B 29/00; B60H 3/00; B60H 1/00
(52) U.S. Cl. ........................... 165/42; 165/43; 165/202; 454/121; 454/156; 454/160; 454/161; 237/12.3 A; 237/12.3 B
(58) Field of Search ............................ 165/42, 43, 202; 454/160, 161, 121, 156; 237/12.3 A, 12.3 B

(56) References Cited

U.S. PATENT DOCUMENTS

| | | | | |
|---|---|---|---|---|
| 2,738,718 A | * | 3/1956 | Reynolds ..................... | 454/161 |
| 3,948,312 A | * | 4/1976 | Nisbet .......................... | 165/42 |
| 4,157,113 A | | 6/1979 | Karran et al. ................. | 165/42 |
| 4,842,047 A | * | 6/1989 | Sakurada et al. ............. | 165/43 |
| 4,940,083 A | * | 7/1990 | Takenaka et al. ............. | 165/43 |
| 5,009,392 A | * | 4/1991 | Ostrand ....................... | 251/180 |
| 5,062,353 A | | 11/1991 | Ostrand ........................ | 165/42 |
| 5,062,473 A | * | 11/1991 | Ostrand et al. ............... | 165/43 |
| 5,199,485 A | * | 4/1993 | Ito et al. ....................... | 165/43 |
| 6,131,652 A | * | 10/2000 | Ito et al. ....................... | 165/42 |

FOREIGN PATENT DOCUMENTS

| | | | | |
|---|---|---|---|---|
| DE | 3421323 | * | 12/1985 | ................ 454/121 |
| DE | 197 49 104 | | 5/1998 | |
| DE | 197 50 381 | | 5/1998 | |
| EP | 0289405 | * | 11/1988 | |
| FR | 2 703 305 | | 10/1994 | |
| GB | 973035 | * | 10/1964 | .................. 165/43 |
| JP | 0087709 | * | 6/1982 | .................. 165/43 |
| JP | 0095212 | * | 6/1982 | ................ 454/160 |
| JP | 57-26010 | * | 12/1982 | |
| JP | 5-58143 | * | 3/1993 | .................... 237/5 |
| JP | 6-270654 | * | 9/1994 | |
| WO | WO 96/29211 | * | 9/1996 | |

OTHER PUBLICATIONS

French Search Report Dated Sep. 23, 1999.

* cited by examiner

*Primary Examiner*—John K. Ford
(74) *Attorney, Agent, or Firm*—Morgan & Finnegan, LLP

(57) ABSTRACT

A motor-vehicle heating and/or air conditioning device has a cold-air duct (12), a hot-air duct (14) housing a heating radiator (18), a mixing chamber (28) communicating with respective air outlets (24, 26) of the ducts, and mixing means which comprise at least one flap (30) configured in such a way that, when the flap passes from a "hot" position to a "cold" position, the shutter wall (34) of the flap first of all clears a region of the outlet (24) of the cold-air duct which is close to the outlet (26) of the hot-air duct, so as to promote the mixing of a cold airflow (F1) and of a hot airflow (F2).

12 Claims, 8 Drawing Sheets

MOTOR VEHICLE HEATING AND/OR AIR CONDITIONING DEVICE WITH IMPROVED AIR MIXING

FIELD OF THE INVENTION

The invention relates to heating and/or air conditioning devices for motor vehicles.

BACKGROUND OF THE INVENTION

It relates more particularly to a device comprising a cold-air duct, a hot-air duct housing a heating radiator, a mixing chamber communicating with respective air outlets of said ducts, and mixing means suitable for controlling said air outlets in chosen proportions so as to set the temperature of the air in the mixing chamber.

Devices of this type are already known, making it possible to mix a flow of cold air originating from the cold-air duct and a flow of hot air originating from the hot-air duct in controlled proportions in order to obtain an airflow at an adjusted temperature in the mixing chamber.

This airflow is then distributed into the passenger compartment of the vehicle by appropriate distribution means, comprising ducts terminating in various vents arranged at chosen locations in the passenger compartment.

The mixing means generally comprise a mixing flap, of the butterfly type, mounted pivoting about a spindle situated close to the heating radiator and exhibiting two wings suitable for controlling the outlets of the cold-air and hot-air ducts respectively.

Such a flap can be deflected from one to the other of two extreme positions comprising a "hot" position (in which the outlet of the cold-air duct is closed and the outlet of the hot-air duct is open) and a "cold" position (in which the outlet of the hot-air duct is closed and the outlet of the cold-air duct is open).

Such a device, with a mixing flap of the butterfly type, has the particular drawback that, when the flap passes from the "hot" position to the "cold" position, cold air enters the mixing chamber from a region of the outlet of the cold-air duct which is located close to a free edge of the butterfly flap. This particular region lies exactly on the opposite side to the region of the outlet of the hot-air duct through which the hot airflow enters the mixing chamber, that is to say close to an opposite edge of the butterfly flap. It results therefrom that the cold airflow and the hot airflow have a tendency to be layered, so that mixing of them can occur only a long way from the heating radiator, which requires an increase in the volume of the mixing chamber and hence of the device.

OBJECT OF THE INVENTION

The object of the invention is essentially to at least partly mitigate such drawbacks.

Hence the invention envisages promoting the meeting and the effective mixing of the cold airflow and of the hot airflow in a region closer to the heating radiator, so as to leave space, downstream of the heating radiator, for the distribution of the air.

SUMMARY OF THE INVENTION

According to the present invention there is provided a motor-vehicle heating and/or air conditioning device comprising a cold-air duct, a hot-air duct housing a heating radiator, a mixing chamber communicating with respective air outlets of said ducts, and mixing means suitable for controlling said air outlets in chosen proportions so as to set the temperature of the air in the mixing chamber, wherein the mixing means comprise at least one flap including a shutter wall arranged in such a way that, when they pass from a "hot" position, in which the outlet of the cold-air duct is closed, to a "cold" position, in which the outlet of the hot-air duct is closed, the shutter wall first of all clears a region of the outlet of the cold-air duct which is close to the outlet of the hot-air duct.

Hence, during the progressive opening of the flap, in order to pass from the "hot" position to the "cold" position, the flap progressively clears a cold-air passage in a region close to the heating radiator. It results therefrom that the cold airflow and the hot airflow can be mixed optimally and, that being so, the size of the mixing chamber can be reduced by comparison with the known devices.

In a first general embodiment of the invention, the mixing means comprise a main flap mounted pivoting about a spindle and including a wall which, in the "hot" position, closes the outlet of the cold-air duct and, in the "cold" position is retracted into a position away from the radiator, as well as auxiliary means, coordinated with the main flap, for preventing the hot air passing when the main flap is in "cold" position.

This first general form may be applied to the case in which the heating radiator is suitable for being traversed by a hot liquid under the control of a throughput-setting cock. In this case, the auxiliary means comprise a control suitable for actuating this cock in such a way that it is set in a closed position, preventing the hot liquid from circulating when the main flap is in "cold" position.

This first general form may also be applied to a heating radiator suitable for being traversed continuously by a hot liquid. In this case, the auxiliary means comprise at least one auxiliary flap suitable for closing the hot-air duct when the main flap is in cold position.

This auxiliary flap may be housed in the hot-air duct, upstream of the heating radiator.

By way of example, provision can then be made for the main flap to be a drum flap, and for the auxiliary flap to be a butterfly flap.

It is generally preferred for the auxiliary flap to be suitable for controlling the outlet of the hot-air duct, that is to say for it to be located downstream of the heating radiator.

In such a case, the mixing means essentially comprise a main flap and an auxiliary flap.

The main flap and the auxiliary flap may each be chosen from different types of flaps.

In one embodiment of the invention, the main flap is a drum flap and the auxiliary flap is a drum flap.

Different variant embodiments can then be envisaged.

In one variant, the auxiliary flap is mounted pivoting about a spindle spaced away from the rotational spindle of the main flap.

In another variant, the main flap and the auxiliary flap have respective rotational spindles which are coaxial or substantially coaxial.

Provision can then be made for the main flap and the auxiliary flap to be capable of turning with opposite directions of rotation between the "cold" position in which the two flaps are spaced apart, the main flap opening the outlet of the cold-air duct and the auxiliary flap closing the outlet of the hot-air duct, and the "hot" position in which the two flaps are brought together and jointly close the outlet of the cold-air duct.

In another variant, the main flap and the auxiliary flap are capable of turning in the same rotational direction between the "cold" position, in which the main flap opens the outlet of the cold-air duct and the auxiliary flap closes the outlet of the hot-air duct, and the "hot" position in which the main flap closes the outlet of the cold-air duct and the auxiliary flap opens the outlet of the hot-air duct.

In this latter variant, the main flap and the auxiliary flap may form a single-piece assembly and be mounted in rotation about a single spindle.

They can also be separate and mounted in rotation about adjacent parallel spindles.

In another embodiment of the invention, the main flap is a drum flap and the auxiliary flap is a flag flap.

It can then be envisaged, for example, for the main flap and the auxiliary flap to form a single-piece assembly mounted in rotation about a single spindle.

It is also possible for these flaps to be mounted in rotation about parallel respective spindles.

In another embodiment of the invention, the main flap is a drum flap and the auxiliary flap is a butterfly flap. In such a case, the auxiliary flap advantageously includes two non-coplanar wings.

For preference, in this case, the main flap and the auxiliary flap are mounted in rotation in opposite directions about parallel respective spindles.

In another embodiment, the main flap is a flag flap and the auxiliary flap is a drum flap.

Provision can be made for these flaps to form a single-piece assembly mounted in rotation about a single spindle.

It is also possible to provide for these two flaps to be mounted in rotation in the same direction about parallel respective spindles.

In another embodiment, the main flap is a flag flap and the auxiliary flap is a flag flap.

In this case, it is particularly advantageous for the main flap and the auxiliary flap to be mounted in rotation about parallel respective spindles.

In another embodiment, the main flap is a butterfly flap and the auxiliary flap is a drum flap.

In such a case, it is preferred for the main flap and the auxiliary flap to be mounted in rotation in opposite directions about parallel respective spindles.

In another embodiment, the main flap is a butterfly flap and the auxiliary flap is a butterfly flap.

In such a case, it is advantageous for the two flaps to be mounted in rotation in the same direction about parallel respective spindles.

BRIEF DESCRIPTION OF THE DRAWINGS

In the description which follows, given by way of example, reference will be made to the attached drawings, in which.

DESCRIPTION OF THE PREFERRED EMBODIMENTS

Figure 1:
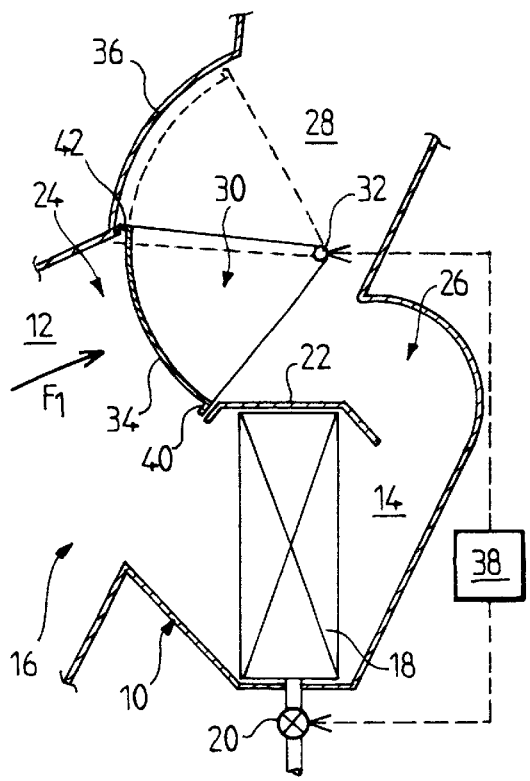
FIG. 1 is a sectional view of a device according to a first embodiment of the invention, represented in "hot" position.

Referring first of all to FIG. 1, a device is represented for heating and/or air conditioning the passenger compartment of a motor-vehicle. This device comprises a housing 10 delimiting a cold-air duct 12 and a hot-air duct 14, both supplied with cold air (arrow F1) from a common inlet 16.

The hot-air duct 14, also called air-heating duct, houses a heating radiator 18 suitable for being traversed by a hot liquid, usually the liquid serving for cooling the engine of the vehicle. The flow of this liquid in the radiator 18 takes place under the control of a throughput-setting cock 20. Hence, when this cock is closed, the airflow which passes through the heating radiator is not heated and, conversely, when this cock is open, the airflow is heated.

In this example, the radiator 18 is placed in a substantially vertical position below a partition 22 which contributes, within the housing 10, to delimiting two air outlets 24 and 26 corresponding respectively to the cold-air duct 12 and to the hot-air duct 14. These two outlets give onto a mixing chamber 28 which is in communication with various air-outlet vents (not represented) distributed throughout the passenger compartment of the vehicle.

A mixing flap 30 is housed in the housing 28, in this example a drum flap, mounted pivoting about a spindle 32 and possessing a shutter wall 34 of substantially cylindrical shape centered on the spindle 32 and extending between two extreme edges 40 and 42.

The flap 30 is able to pivot from one to the other of two extreme positions, comprising a position called "hot position" in which the outlet 24 of the cold-air duct 12 is closed (flap represented in solid line) and a position called "cold position" in which the outlet 24 of the cold-air duct is open (flap represented in broken line). In this latter position, the flap is raised upwards and retracted behind a wall 36 of the housing 10. The operation of the flap 30 is coordinated with the cock 20 in such a way that, when the flap is in "hot" position, the cock 20 is open and, when the flap is in "cold" position, the cock 20 is closed. To that end, the device comprises control means 38, represented diagrammatically, linked, on the one hand, to a mechanism for actuating the flap 30 and, on the other hand, to a mechanism for actuating the cock 20.

When the flap is in the "hot" position, its shutter wall completely closes the outlet 24 of the duct 12 and then extends between the partition 22 and the wall 36, so that the airflow is obliged to sweep over the radiator 18, which is hot, because the cock 20 is open.

When the flap is in "cold" position, the outlet 24 of the duct 12 is open, as is the outlet 26 of the duct 14. The air is thus divided into two flows which rejoin in the mixing chamber. However, as the cock 20 is closed, this chamber is fed only with cold air.

Figure 2:
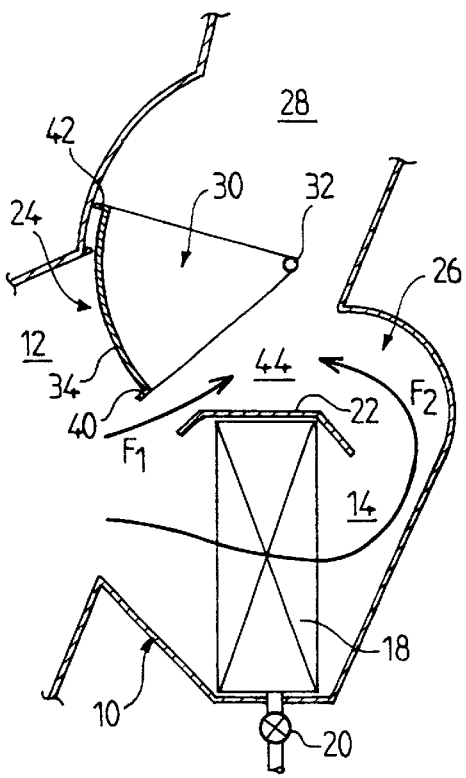
FIG. 2 is a view similar to FIG. 1, in which the device is in mixing position.

When the flap is shifted from the "hot" position to the "cold" position, it pivots in the clockwise direction (in FIGS. 1 and 2). At the start of this rotational movement, the edge 40 which, at the outset, was in leaktight contact with the partition 22, moves away from the latter which makes it possible to clear a region of the outlet of the cold-air duct which is close to the partition 22 and thus to the outlet of the hot-air duct. It results therefrom (FIG. 2) that a cold airflow F1 can penetrate into the mixing chamber 28 in a region close to the heated airflow F2 which penetrates into the mixing chamber 28 through the outlet 26. This makes it possible to mix these two airflows in a mixing region 44 (FIG. 2) which is situated immediately above the radiator 18 and which is in immediate proximity to the respective outlets 24 and 26 of the ducts 12 and 14. This results in a mixing of the two flows in a low region of the mixing chamber 28, avoiding any risk of layering of the flows. This makes it possible to design a mixing chamber 28 which possesses a vertical size which is reduced by comparison with the prior devices.

Obviously, the flap 30 can occupy a multiplicity of intermediate positions, called mixing positions, between the "cold" and "hot" positions, which makes it possible to set the proportion of the two airflows and, consequently, the temperature of the air in the mixing chamber 28. This air, at adjusted temperature, is then distributed into the passenger compartment of the vehicle through appropriate vents.

Figure 3:
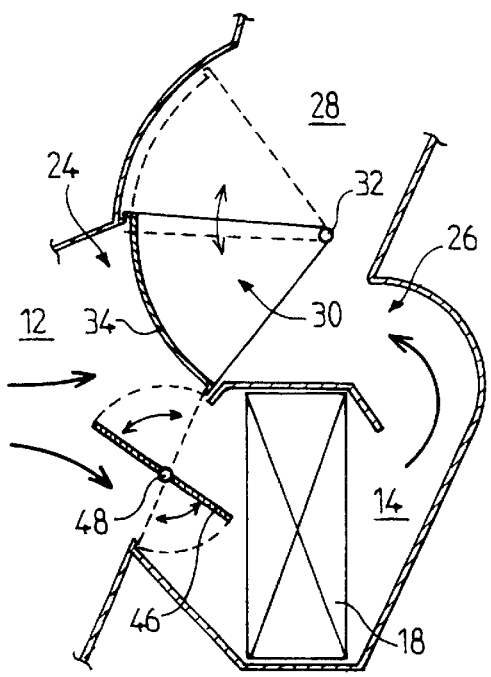
FIG. 3 is a sectional view of a device according to a second embodiment of the invention.

Referring now to FIG. 3, a device is represented which is similar to that of FIGS. 1 and 2, except that here the heating radiator 18 is permanently traversed by a hot liquid. It is therefore necessary, in the "cold" position, to prevent an airflow passing through the radiator 18. To that end, an auxiliary flap 46 is provided, housed in the hot-air duct 14 upstream of the radiator 18. This flap 46 is a butterfly flap mounted pivoting about a spindle 48 parallel to the spindle 32 of the flap 30, which is identical to that of FIGS. 1 and 2. The flaps 30 and 46 are controlled in coordination, in such a way that, in the "cold" position and the "hot" position, the flap 46 is respectively closed and open.

Figure 4:
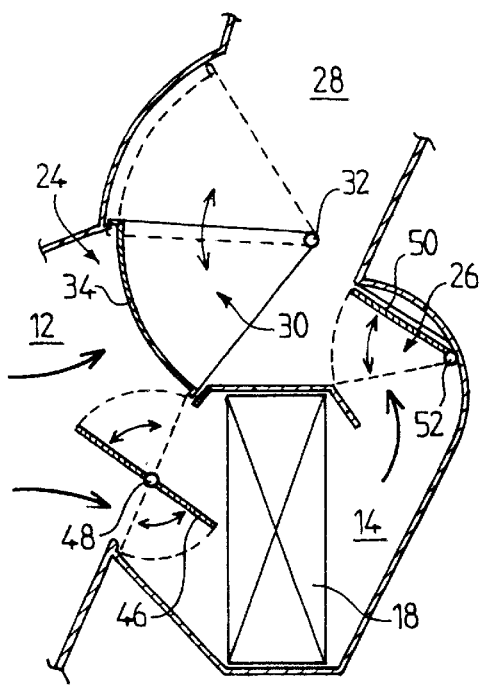
FIG. 4 is a sectional view of a device according to a third embodiment of the invention.

The device of FIG. 4 is identical to that of FIG. 3, except that it further includes an auxiliary flap 50 of the flag type mounted pivoting about a spindle 52 and able to control the outlet 26 of the hot-air duct 14. It should be noted that it is possible to close the hot-air duct 14 by having recourse to one and/or other of the flaps 48 and 50. In all cases, when the main flap 30 is in "cold" position, one and/or the other of the auxiliary flaps 46 and 50 prevent a hot airflow arriving in the mixing chamber 28.

Figure 5:
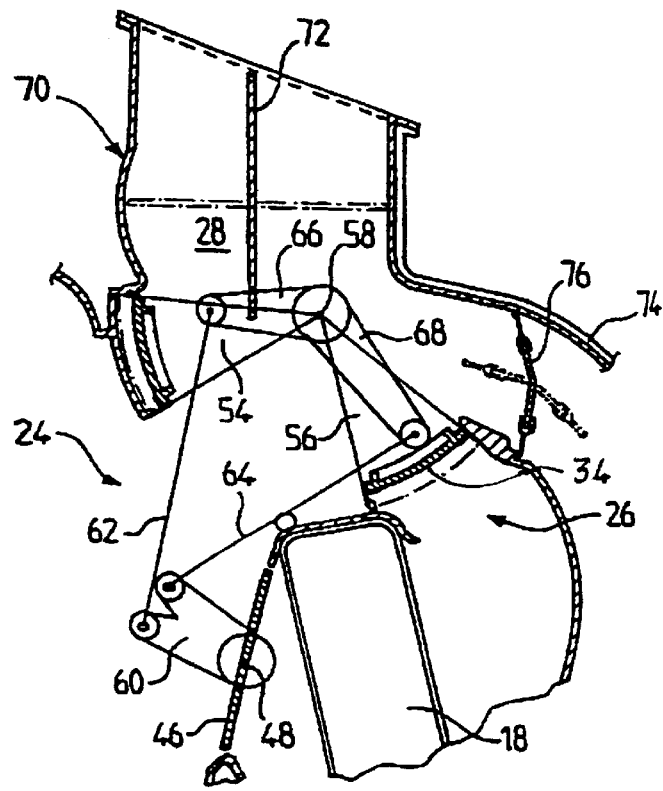
FIG. 5 is a sectional view of a device according to a fourth embodiment of the invention, comprising two flaps represented in "cold" position.
Figure 6:
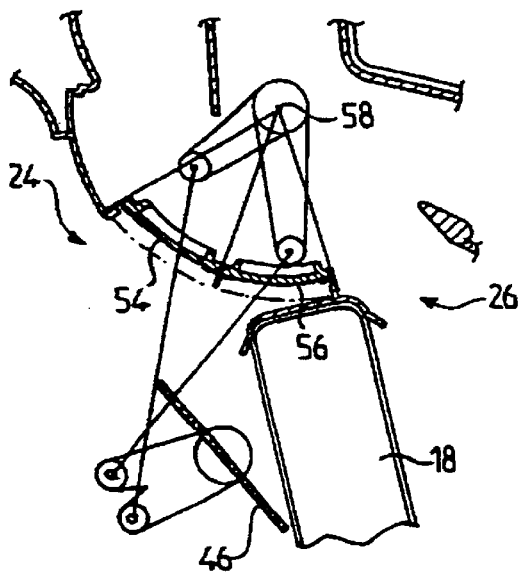
FIG. 6 is a view similar to FIG. 5 in which the flaps are in "hot" position.
Figure 7:
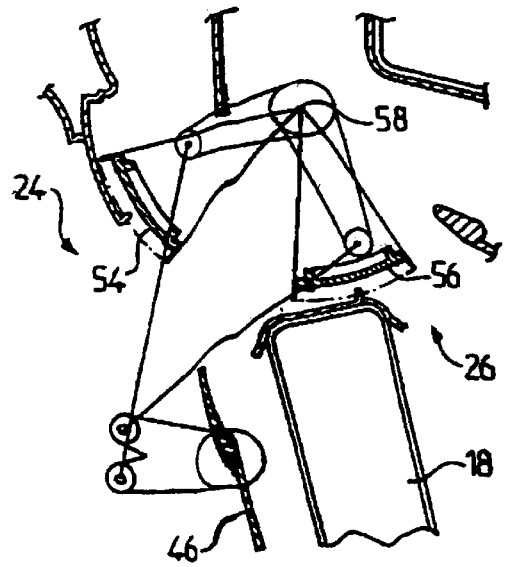
FIG. 7 is a view similar to FIG. 5 in which the flaps are in mixing position.

Referring now to FIGS. 5 to 7, another embodiment of the device of the invention is shown. The mixing means here comprise a main flap 54 of the drum type and an auxiliary flap 56, also of the drum type, which can pivot in rotation about a common spindle 58, that is to say coaxially. These two flaps are able to turn with opposite directions of rotation between the "cold" position in which the flaps are spaced apart (FIG. 5) and the "hot" position in which the two flaps are brought together (FIG. 6). In the "cold" position, the main flap 54 opens the outlet 24 of the cold-air duct, while the auxiliary flap 56 closes the outlet 26 of the hot-air duct. In the "hot" position, the two flaps 54 and 56 jointly close the outlet 24 of the cold-air duct and clear the outlet 26 of the hot-air duct. The coordinated pivoting of the two flaps is carried out by virtue of a control yoke 60 to which two link rods 62, 64 are articulated. The latter are articulated respectively to two levers 66 and 68 which are respectively integral in rotation with the flaps 54 and 56.

As in the preceding embodiments, when the main flap 54 moves away from the "hot" position (FIG. 6) to the "cold" position (FIG. 5), it pivots in the clockwise direction and clears a region of the outlet 24 of the cold-air duct which is adjacent to the outlet 26 of the hot-air duct, which promotes the mixing of the two airflows (FIG. 7).

The device further comprises an auxiliary flap 46 of the butterfly type similar to that of FIGS. 3 and 4 and mounted in rotation about a spindle 48 which is common with the rotational spindle of the control yoke 60.

An outlet duct 70 has been represented in FIG. 5, communicating with the mixing chamber 28 and controlled by a flap 72 so as to feed vents for deicing and ventilation of the vehicle, as well as another outlet duct 74, called "feet duct", controlled by a flap 76.

Figure 8:
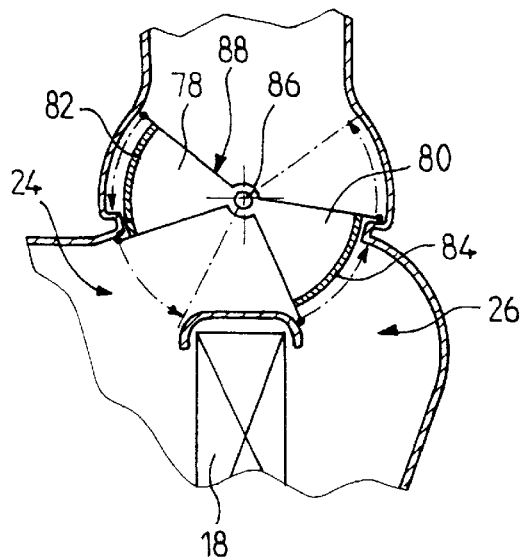
FIG. 8 is a sectional view of a device according to a fifth embodiment of the invention, represented in "cold" position.
Figure 9:
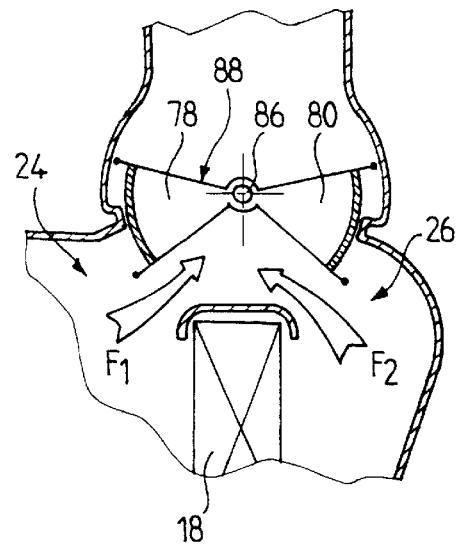
FIG. 9 is a view similar to FIG. 8, in which the device is represented in mixing position.

The device of FIGS. 8 and 9 comprises a main flap 78 of the drum type and an auxiliary flap 80 of the drum type and possessing respective shutter walls 82 and 84. These two flaps 78 and 80 are mounted pivoting about a common spindle 86 so as to constitute a single-piece assembly 88. They thus turn in the same direction of rotation between the "cold" position in which the main flap 78 opens the outlet 24 of the hot-air duct and the auxiliary flap 80 closes the outlet 26 of the hot-air duct (flaps represented in solid line) and the "hot" position in which the main flap 78 closes the outlet of the cold-air duct and the auxiliary flap 80 opens the outlet of the hot-air duct (flaps represented in broken line).

As in the preceding embodiments, when the flap 78 is shifted from the "hot" position to the "cold" position, it starts to clear a region of the outlet 24 of the cold-air duct which is close to the air outlet 26 of the hot-air duct, promoting the mixing of the airflows F1 and F2 (FIG. 9).

Figure 10:
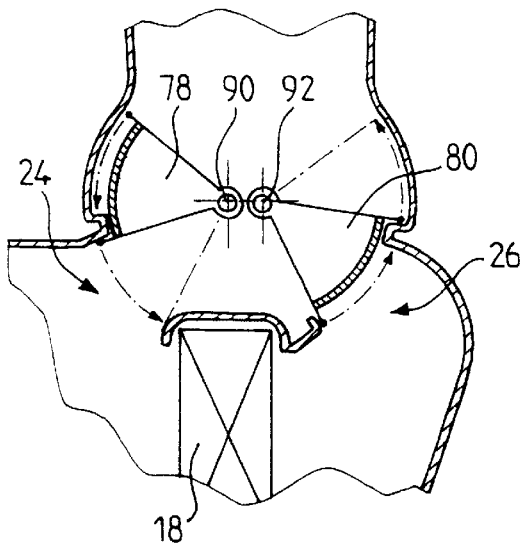
FIG. 10 is a sectional view of a device according to a variant of FIG. 8, represented in "cold" position.
Figure 11:
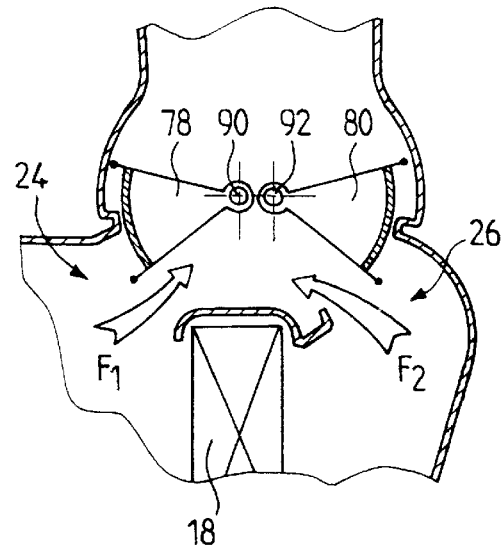
FIG. 11 is a view similar to FIG. 10, the device being represented in mixing position.

The device of FIGS. 10 and 11 constitutes a variant of that of FIGS. 8 and 9. The flaps 78 and 80, still of the drum type, instead of forming a single-piece assembly, are separate and mounted in rotation about adjacent parallel spindles, 90 and 92 respectively. The flaps 78 and 80 are both able to pivot in the same rotational direction. The operation of the device of FIGS. 10 and 11 is similar to that of FIGS. 8 and 9.

Figure 12:
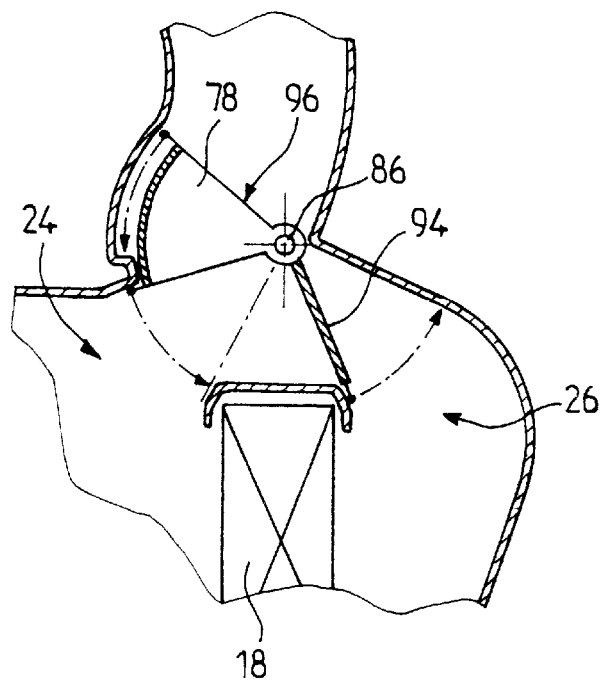
FIG. 12 is a sectional view of a device according to a sixth embodiment of the invention, represented in "cold" position.
Figure 13:
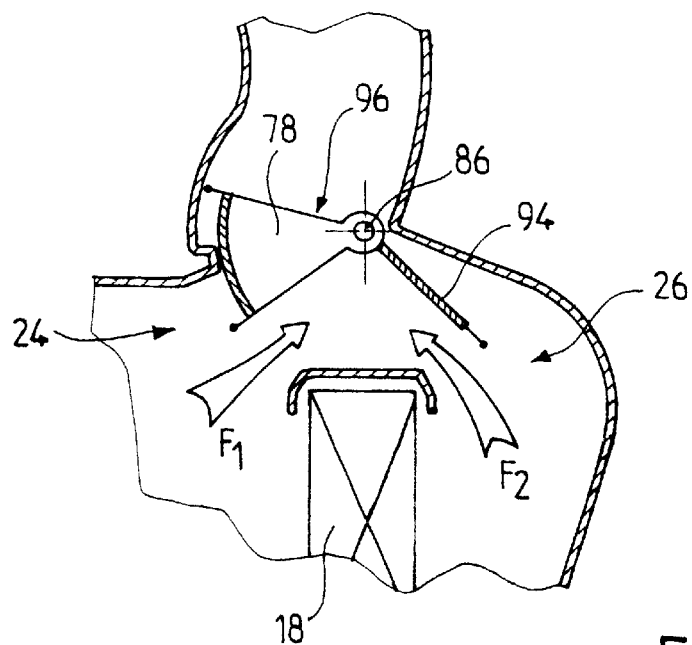
FIG. 13 is a view similar to FIG. 12, in which the device is represented in mixing position.

The device of FIGS. 12 and 13 is related to that of FIGS. 8 and 9 and comprises a main flap 78 of the drum type similar to that described previously, and an auxiliary flap 94 of the flag type. These two flaps form a single-piece assembly 96 mounted in rotation about a common spindle 86. The operation of the device of FIGS. 12 and 13 is similar to that of FIGS. 8 and 9.

Figure 14:
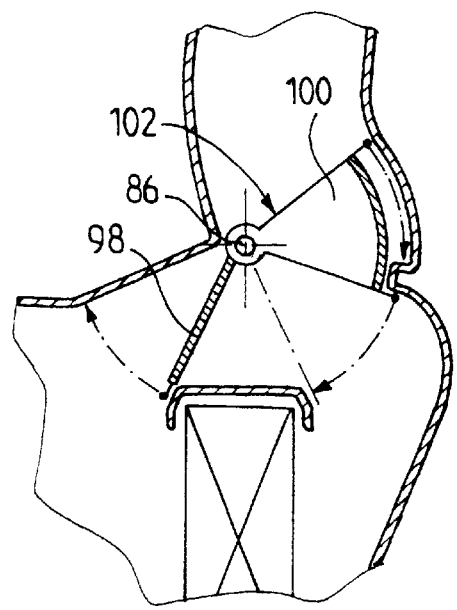
FIG. 14 is a sectional view of a device according to a seventh embodiment of the invention, represented in "hot" position.

The device of FIG. 14 is related to that of FIG. 12, except that the nature of the two flaps has been reversed. The device here comprises a main flap 98 of the flag type and an auxiliary flap 100 of the drum type which form a single-piece assembly 102 mounted in rotation about a common spindle 86.

Figure 15:
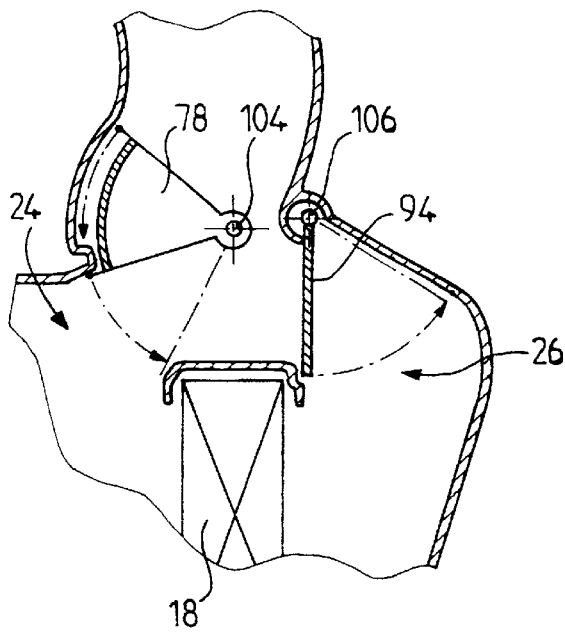
FIG. 15 is a sectional view similar to FIG. 12 in a variant embodiment.
Figure 16:
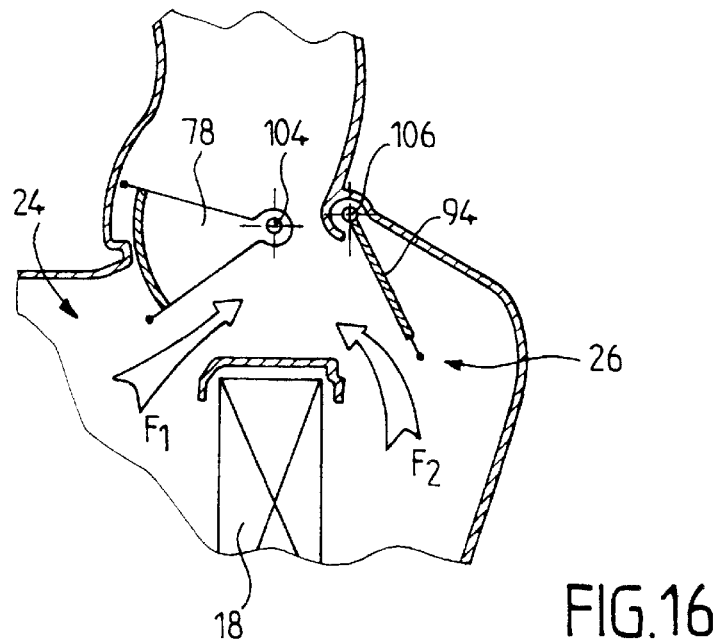
FIG. 16 is a view similar to FIG. 15, in which the device is in mixing position.

The device of FIGS. 15 and 16 constitutes a variant of FIGS. 12 and 13 in the sense that the flaps 78 and 94, instead of forming a single-piece assembly, are separate and a mounted in rotation, in the same direction, about parallel respective spindles 104 and 106.

Figure 17:
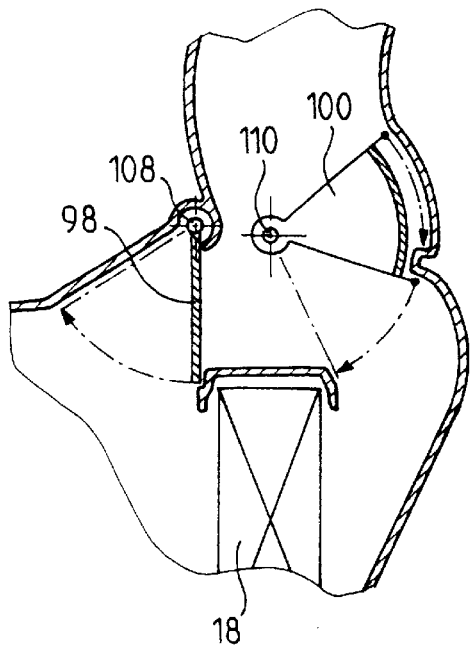
FIG. 17 is a view similar to FIG. 14 in a variant embodiment.

The device of FIG. 17 constitutes a variant of that of FIG. 14, in the sense that the flaps 98 and 100, instead of constituting a single-piece assembly, are separate and mounted in rotation about parallel respective spindles 108 and 110.

Figure 18:
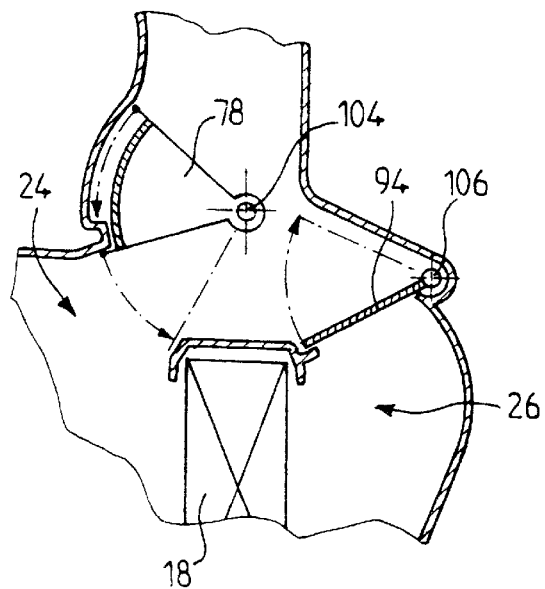
FIG. 18 is a sectional view of a device according to an eighth embodiment of the invention, represented in "cold" position.
Figure 19:
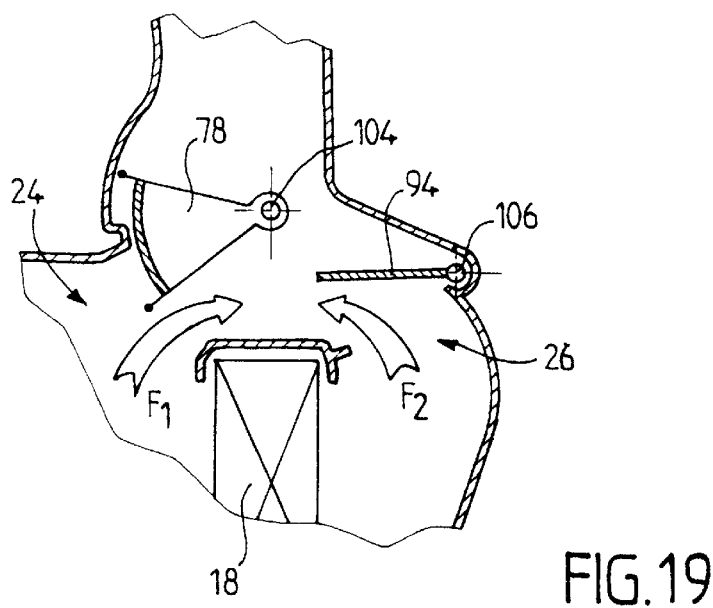
FIG. 19 is a view similar to FIG. 18, in which the device is in mixing position.

The device of FIGS. 18 and 19 is related to that of FIGS. 15 and 16 and comprises a main flap 78 of the drum type and an auxiliary flap 94 of flag type, mounted in rotation about parallel spindles 104 and 106. By comparison with the embodiment of FIGS. 15 and 16, this embodiment differs in the fact that the flaps have opposite directions of rotation and that their rotational spindles are further apart.

Figure 20:
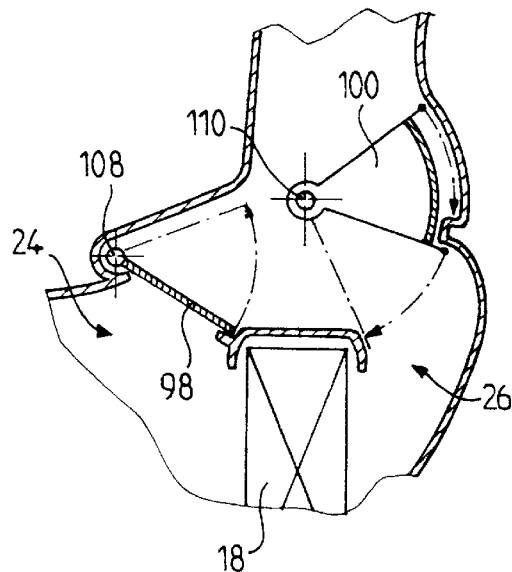
FIG. 20 is a sectional view of a device according to a ninth embodiment of the invention, represented in "hot" position.

The device of FIG. 20 proposes a configuration which is reversed by comparison with that of FIGS. 18 and 19 and at the same time constitutes a variant of that of FIG. 17. The main flap 98 is of the flag type and the auxiliary flap 100 of the drum type, but the respective rotational spindles 108 and 110 are spaced apart and the flaps pivot in opposite directions.

Figure 21:
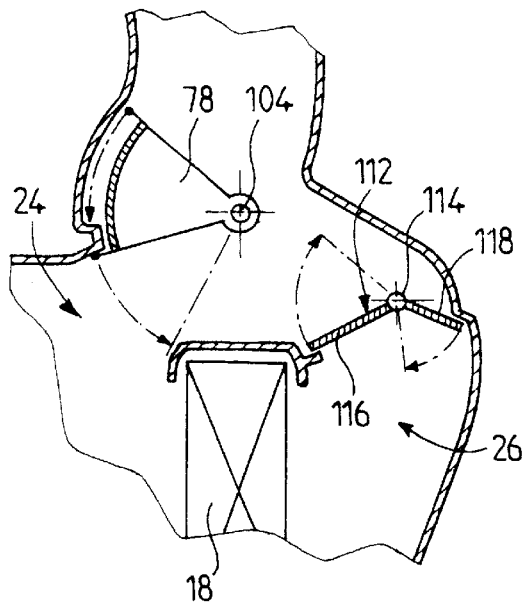
FIG. 21 is a sectional view of a device according to a tenth embodiment, represented in "cold" position.
Figure 22:
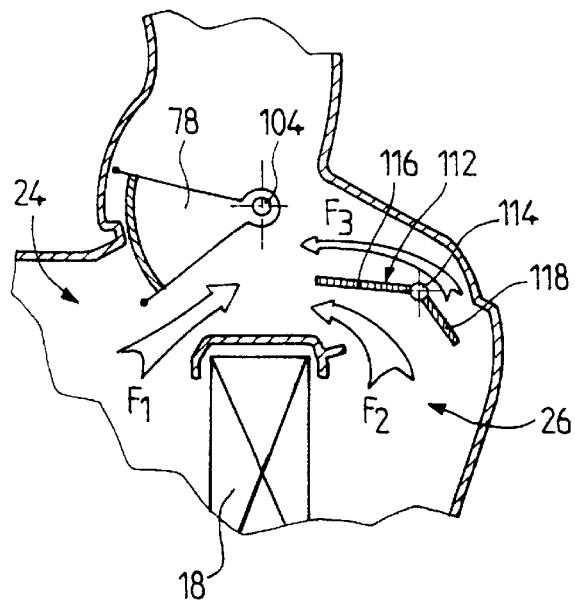
FIG. 22 is a view similar to FIG. 21, in which the device is represented in mixing position.

The device of FIGS. 21 and 22 is related to that of FIGS. 15 and 16. It comprises a main flap 78 of drum type mounted pivoting about a spindle 104. The auxiliary flap here is a flap 112 of butterfly type mounted in rotation about a spindle 114 and possessing two non-coplanar wings 116 and 118. The two flaps are mounted in rotation in opposite directions about their respective spindles 104 and 114. Because the wings 116 and 118 of the flap 112 are not coplanar, they form a deflecting wall which, in the mixing position of FIG. 22, makes it possible to channel a hot airflow F2 encountering the cold airflow F1 so as to provide mixing and another hot airflow F3 allowing layering. The airflow F3 is therefore hotter than the flow resulting from the mixing of the flows F1 and F2.

Figure 23:
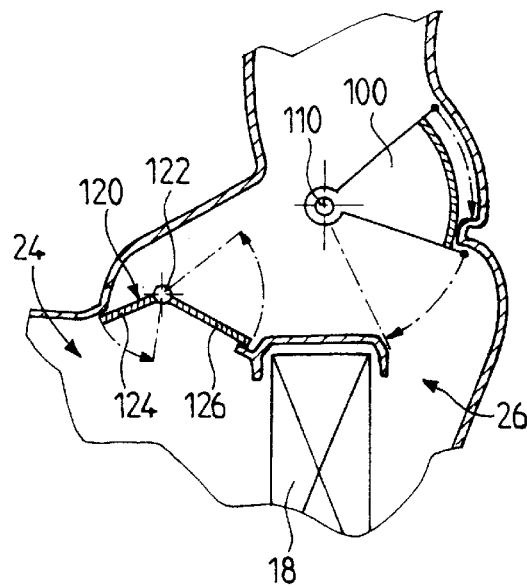
FIG. 23 is a sectional view of a device according to an eleventh embodiment of the invention, represented in "hot" position.

The device of FIG. 23 constitutes an inverted configuration by comparison with the preceding configuration. It includes a main flap 120 of the butterfly type mounted in rotation about a spindle 122 and possessing two non-coplanar wings 124 and 126. It further includes an auxiliary flap 100 of the drum type mounted pivoting about a spindle 110 and being similar to that of FIG. 17. These two flaps are mounted in rotation in opposite directions.

Figure 24:
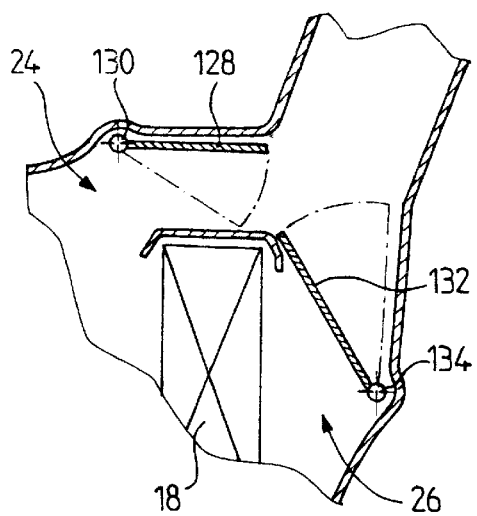
FIG. 24 is a sectional view of a device according to a twelfth embodiment of the invention, represented in "cold" position.
Figure 25:
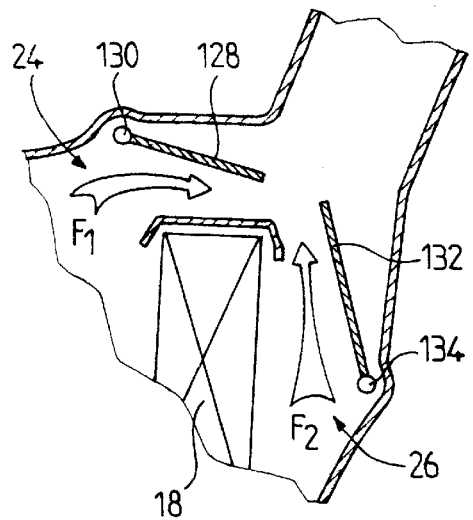
FIG. 25 is a view similar to FIG. 24, in which the device is in mixing position.

The device of FIGS. 24 and 25 comprises a main flap 128 of the flag type mounted pivoting about a spindle 130 and an auxiliary flap 132, also of the flag type, mounted pivoting about a spindle 134. These two spindles are mounted in rotation in the same direction about respective parallel axes.

As can be seen in FIG. 25, these two flaps, in mixing position, make it possible to promote the meeting of the flows of cold air F1 and hot air F2, and consequently to make the temperature of the resulting airflow uniform.

Figure 26:
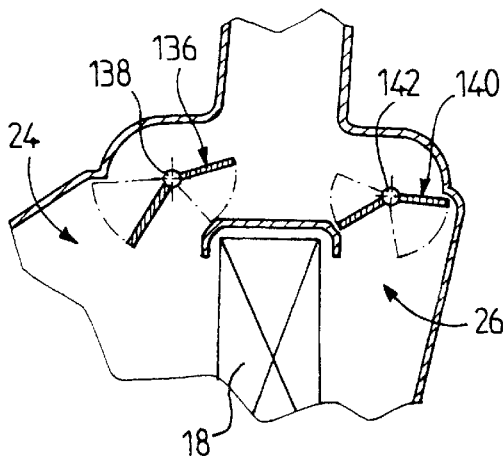
FIG. 26 is a sectional view of a device according to a thirteenth embodiment of the invention, in which the device is in "cold" position.
Figure 27:
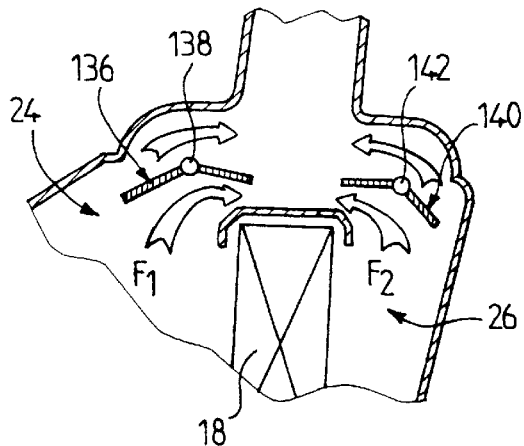
FIG. 27 is a view similar to FIG. 26, the device being represented in mixing position.

In the embodiment of FIGS. 26 and 27, the device comprises a main flap 136 of the butterfly type, mounted pivoting about a spindle 138 and an auxiliary flap 140 mounted pivoting about a spindle 142. These two flaps are mounted in rotation in the same direction about their respective spindles 138 and 142, which are parallel. The flaps 136 and 140 each have non-coplanar wings forming deflectors, as shown in FIG. 27.

In all the previously described embodiments, the device comprises mixing means which make it possible, when passing from the "hot" position to the "cold" position, to direct a cold airflow straight into a hot airflow in order to ensure that they mix in a region close to the heat exchanger, which makes it possible to reduce the volume of the mixing chamber, and thus the overall size of the device.

Obviously, the invention is not limited to the embodiments described previously by way of example, and extends to other embodiment variants.

It will be understood, in the context of the invention that, when several flaps are used, it is possible to use flaps of the same type or of different types.

What is claimed is:

1. A motor-vehicle air conditioning device comprising a cold-air duct, a hot-air duct housing a heating radiator, a mixing chamber communicating with respective air outlets of said ducts, and mixing means suitable for controlling said air outlets in chosen proportions so as to set the temperature of the air in the mixing chamber, wherein the mixing means comprise at least a main flap and a first auxiliary flap, each including a shutter wall wherein when said flaps are spaced apart in a "cold position" the outlet of the hot-air duct is closed, and when said flaps are brought together to contact each other in a "hot position", the outlet of the cold-air duct is closed, and wherein said main and first auxiliary flaps are mounted pivoting about a spindle, said device further comprising a second auxiliary means suitable for closing the hot-air duct when the main flap and first auxiliary flaps are in the "cold" position, wherein the second auxiliary means comprises a flap that is housed in the hot-air duct, upstream of the heating radiator, and wherein the main flap is a drum flap and the second auxiliary means is a butterfly flap.

2. The device of claim 1, wherein the main flap is a drum flap and the first auxiliary flap is a drum flap.

3. The device of claim 2, wherein the main flap and the first auxiliary flap have respective rotational spindles which are coaxial or substantially coaxial.

4. The device of claim 3, wherein the main flap and the first auxiliary flap are capable of turning with opposite directions of rotation between the "cold" position and the "hot" position.

5. The device of claim 1, wherein said device further comprises an outlet duct.

6. The device of claim 5, wherein said device further comprises a feet duct.

7. The device of claim 6, wherein said outlet duct includes a flap.

8. The device of claim 7, wherein said feet duct includes a flap.

9. The device of claim 4, wherein said device further comprises an outlet duct.

10. The device of claim 9, wherein said device further comprises a feet duct.

11. The device of claim 10, wherein said outlet duct includes a flap.

12. The device of claim 11, wherein said feet duct includes a flap.

\* \* \* \* \*